Oct. 12, 1937. M. P. BLOMBERG 2,095,591
BRAKING SYSTEM FOR CAR TRUCKS
Filed June 4, 1934 4 Sheets-Sheet 2
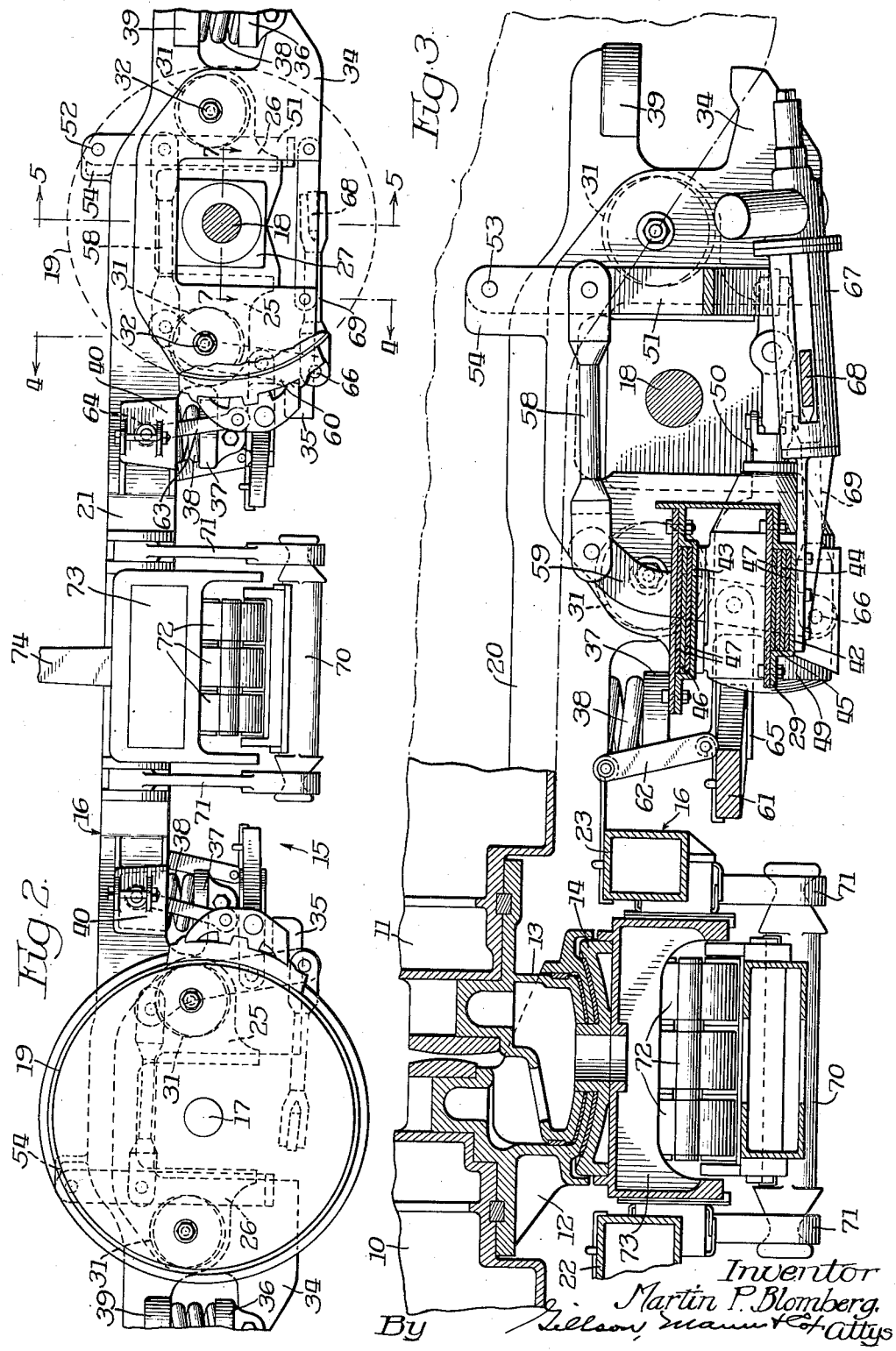
Inventor
Martin P. Blomberg
By Wilson, Mann & Co. Attys Oct. 12, 1937.  M. P. BLOMBERG  2,095,591
BRAKING SYSTEM FOR CAR TRUCKS
Filed June 4, 1934  4 Sheets-Sheet 3
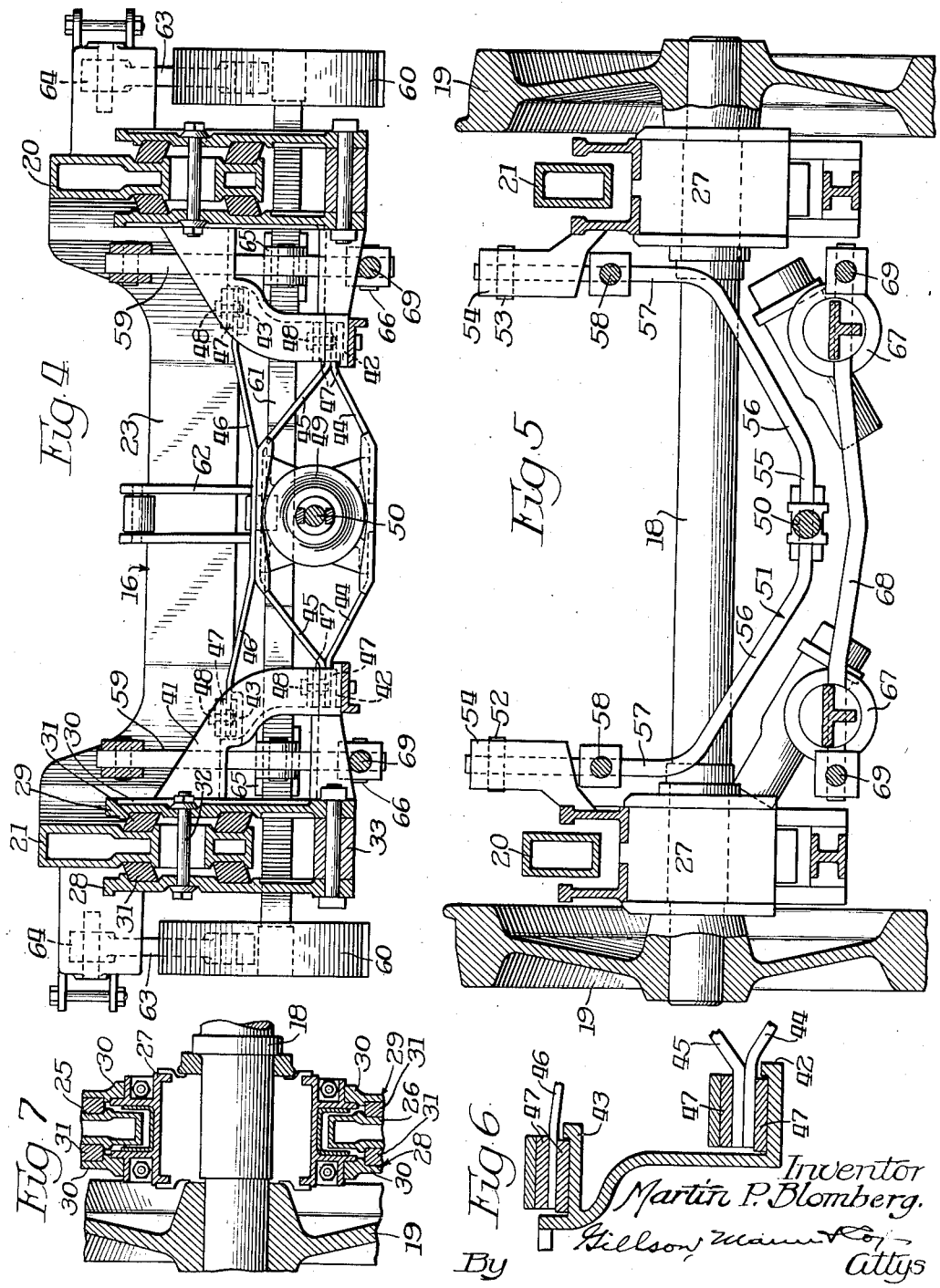
Inventor
Martin P. Blomberg.
By Gillson ———
attys Oct. 12, 1937.  M. P. BLOMBERG  2,095,591
BRAKING SYSTEM FOR CAR TRUCKS
Filed June 4, 1934    4 Sheets-Sheet 4
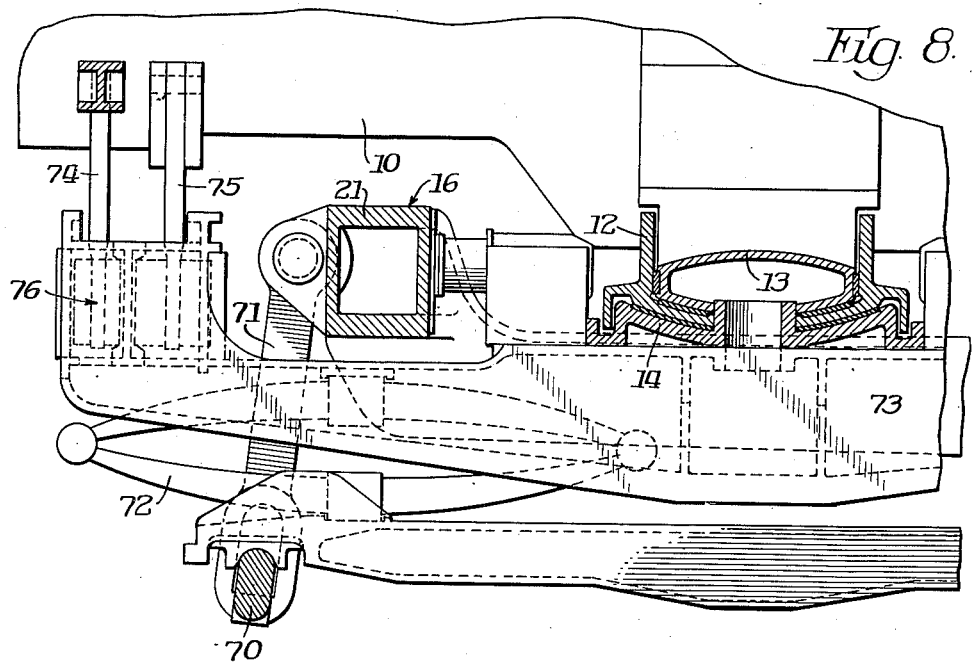
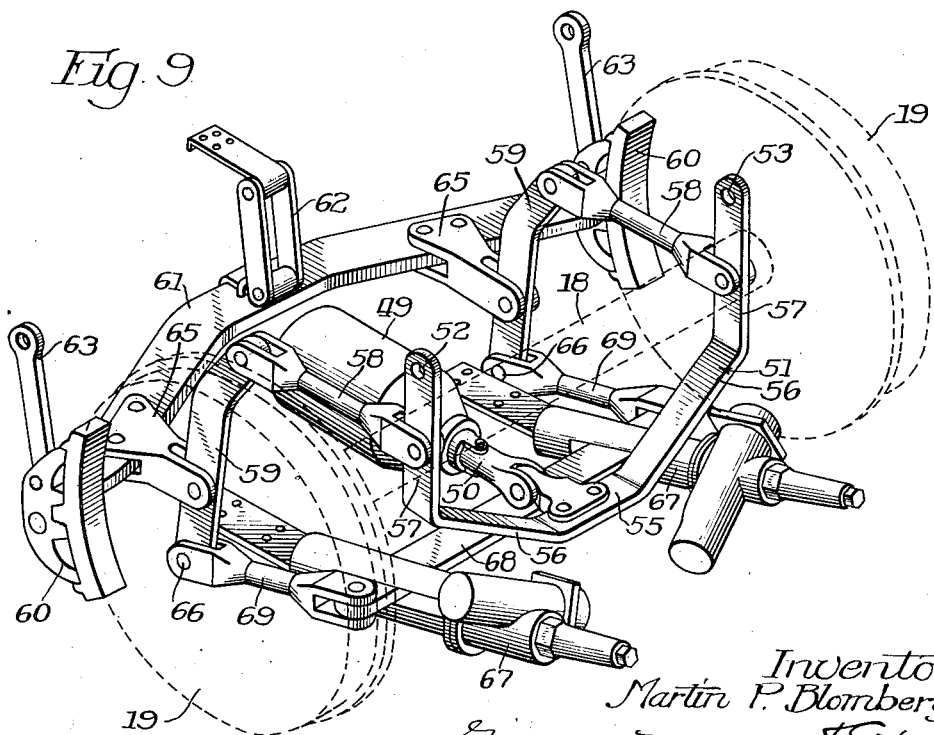
Inventor
Martin P. Blomberg,
By Gilson, Mann &Co
Attys Patented Oct. 12, 1937

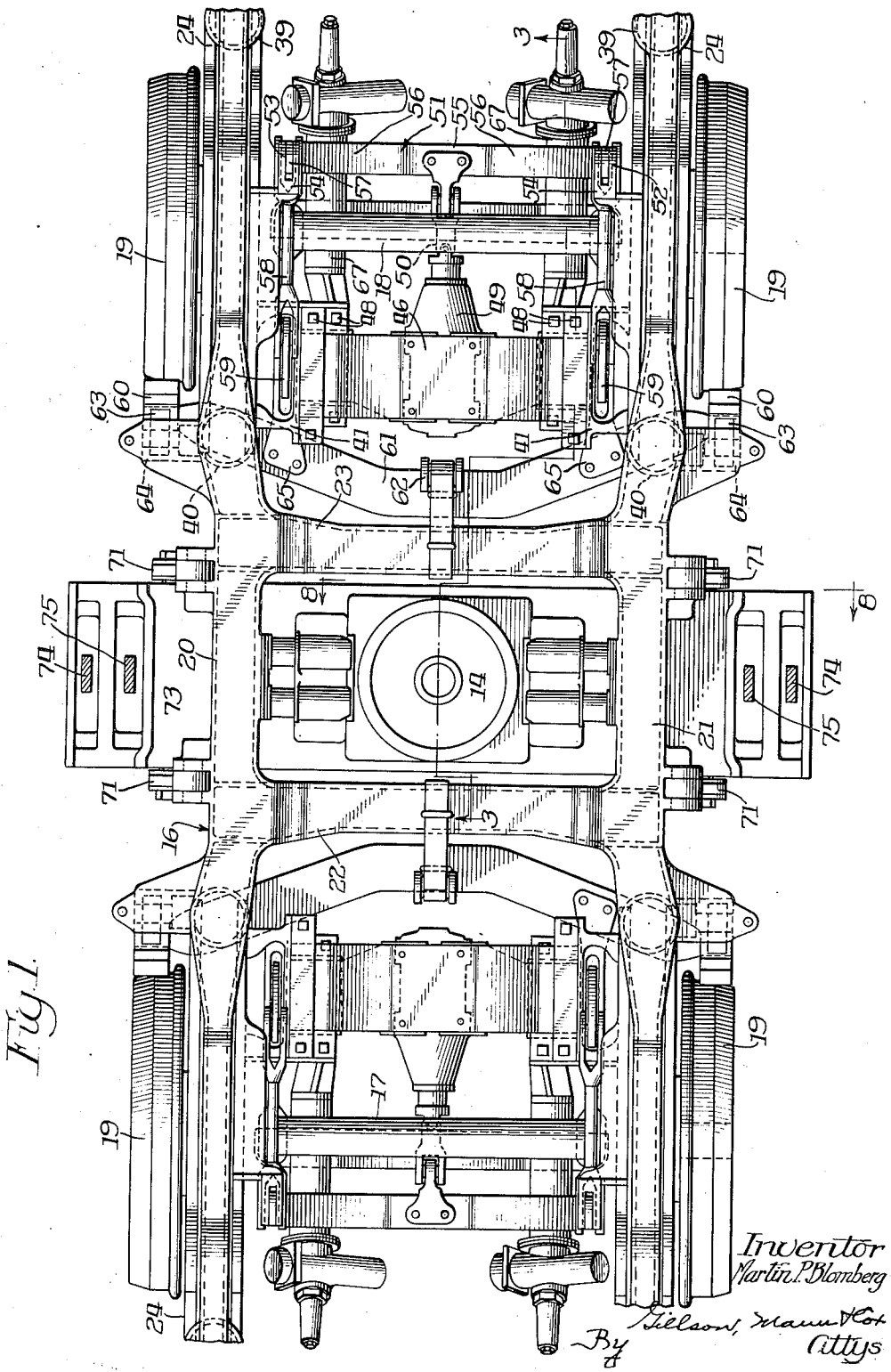

2,095,591

UNITED STATES PATENT OFFICE 2,095,591

BRAKING SYSTEM FOR CAR TRUCKS

Martin P. Blomberg, Chicago, Ill., assignor to Pullman-Standard Car Manufacturing Company, Chicago, Ill., a corporation of Delaware Application June 4, 1934, Serial No. 728,832

13 Claims. (Cl. 188—52)

The principal objects of this invention are to provide a braking system for car trucks that is positive in action, free from false travel due to resilient mounting of the truck frame on the car axles and has its working elements arranged so that economical use is made of available space on the truck.

Further and other objects and advantages will become apparent as the disclosure proceeds and the description is read in conjunction with the accompanying drawings, in which Fig. 1 is a plan view of a car truck equipped with a braking system which follows the teachings of this invention;

Fig. 2 is a side elevational view of the car truck;

Fig. 3 is a longitudinal, vertical section taken on the line 3—3 of Fig. 1;

Figs. 4 and 5 are transverse, sectional views taken on the lines 4—4 and 5—5, respectively, of Fig. 2;

Fig. 6 is a fragmentary detail view showing the supporting means for the braking cylinder;

Fig. 7 is a fragmentary, horizontal, sectional view through one of the journal boxes, the section being taken on the line 7—7 of Fig. 2;

Fig. 8 is a transverse, sectional view at the bolster, the view being taken on the line 7—7 of Fig. 1; and Fig. 9 is a perspective view of the braking system as applied to one of the car axles.

The choice of a particular embodiment of the invention for illustration and description is for the purpose of disclosure only, and the appended claims are to be construed as broadly as the prior art will permit.

The ends of adjacent car bodies are indicated at 10 and 11, and they are equipped with center plate brackets 12 and 13, the former being female and the latter one male, which coact to form an articulated joint between the car bodies. The two center plates rest upon a truck center plate 14 of an articulated truck, generally designated 15. The specific details of the articulated joint are unimportant here, and the joint is illustrated merely to show the limited space available for brake rigging.

The car truck 15 comprises a truck frame 16 which is resiliently mounted on wheeled axles 17 and 18, the wheels being indicated at 19. The truck frame consists of side frames 20 and 21 connected by transoms 22 and 23, the side frames being provided with pedestal arms 24 at their outer extremities. These arms project over the axles 17 and 18 and have downwardly extending legs 25 and 26 which fit over the journal boxes 27 but do not contact them (see Fig. 7). In conventional trucks, the pedestal legs have a rather close fit with the sides of the journal boxes, but in the truck of this invention, the frame and axles are capable of relative movement both vertically and horizontally.

The truck frame is supported on the car axles by clamping plates 28 and 29, which have legs 30 (Fig. 7) engaging the sides of the journal boxes. The plates receive the pedestal arms between their inner faces and are equipped with annular grooves in which rubber annuli 31 are placed for supporting the truck frame from the clamping plates. The plates are held together by bolts 32 which are tightened sufficiently to place the rubber annuli 31 under an initial compression.

A tie bar 33 spaces the clamping plates at the bottom and holds them on the journal box.

The clamping plates each have outwardly extending arms 34 and 35 to which spring seats 36 and 37 are pivoted (Fig. 2). Coil springs 38 rest in the seats 36 and 37 and engage enlargements 39 and 40 on the truck side frames and thus assist the rubber annuli 31 in supporting the truck frame.

The coil springs 38 and the rubber annuli 31 work in parallel and together support the truck frame from the clamping plates which in turn are directly mounted on the axle journal boxes. Since there are both side and top clearances between the legs of the truck frame pedestal arms and the journal boxes, the axles have limited movement relative to the truck frame.

If a force is applied to one side of the car axles and the truck frame is held stationary, the rubber annuli are placed in longitudinal shear. This is exactly what happens if conventional brake equipment is employed with a truck of this type, assuming the use of single brakes as distinguished from clasp brakes. The result is a false brake travel due to relative movement between the car axles and the truck frame.

This difficulty is overcome in the present invention by having the braking reaction directed against the journal boxes rather than the truck frame. In effect, the resilient mounting of the truck frame on the car axles is bypassed.

The inner clamping plates 29 are each equipped with a wing 41 having platforms 42 and 43 adapted to support the ends of metal straps 44, 45, and 46 which extend between the wings of adjacent plates 29. The ends of the straps are mounted between rubber pads 47 and are secured in place by bolts 48.

A brake cylinder 49 is carried by the straps 44, 45 and 46 midway between the side frames of the truck so that the reaction at the brake cylinder during the braking operation is transmitted through the straps to the inside clamping plates 29 which in turn transmit the force to the car axles through the journal boxes 27.

The push rod 50 of the brake cylinder works against a lever member 51 pivoted at 52 and 53 to bosses 54 formed on the inner clamping plates 29 (see Figs. 1, 3 and 5). The lever 51 has a horizontal portion 55 where it is attached to the push rod 50, and inclined portions 56 which connect the horizontal portion 55 with vertical portions 57.

The braking force applied to the lever member 51 is transmitted through brake rods 58 and dead truck levers 59 to the brake shoes 60 which are attached to the ends of a brake beam 61 supported from one of the transoms by a brake beam hanger 62. The ends of the brake beam are supported by brake shoe hangers 63 which are attached at 64 to the truck side frames. The beam 61 is connected to the dead truck levers 59 by brackets 65.

The fulcrums 66 of the dead brake levers 59 are automatically adjusted by slack adjusters 67 to take up wear in the brake gear. The slack adjusters are attached to the inner clamping plates 29 (Fig. 3) and serve to move the fulcrum 66 to the right (Fig. 3) upon excess brake travel. The adjusters are of the type illustrated in Figs. 3155 to 3157 and 3161 on pages 1098 and 1099 of Car Builders' Cyclopedia, 1931 Edition, published by Simmons-Boardman Publishing Company of New York, N. Y.

For convenience of assembly, the slack adjusters operate on a cross bar 68 which is connected by a link 69 to the fulcrums 66 of the dead brake levers. In effect, the fulcrums 66 are supported on the inner clamping plates 29 so that again the braking reaction is directed against the journals 27 rather than against the truck frame.

It will thus be seen that not only is the brake cylinder reaction directed against the car journals, but also the reaction at the dead truck lever fulcrum 66, so that when the brake shoes 60 are pressed against the wheels 19, the reaction of the braking operation will be applied directly to the opposite side of the car wheels through the journals 27.

The parts of the car truck which have not previously been described are, generally speaking, conventional, and include a spring plank 70 suspended by swing hangers 71 from the side frames 20 and 21, and carrying elliptical springs 72 which in turn support the truck bolster 73.

Instead of employing side bearings, as is common, the ends of the truck bolster are connected to the end sills 10 and 11 by linkages, indicated generally at 74 and 75, one linkage being connected to one car body, and the other being connected to the other car body, and both being resiliently anchored, as indicated at 76, to the ends of the truck bolster.

What I claim, therefore, is:—

1. In a car truck, a substantially rigid truck frame, a pair of wheeled axles, journal means on the axles for supporting the frame, resilient means interposed between the journal means and the truck frame for cushioning dynamic loads, and brake mechanism associated with the truck arranged so that substantially the entire braking action is directed against the car axles, said mechanism including a brake cylinder, a single brake beam for each axle, a lever member, means for moving said beam to operative position by said lever, said lever and brake cylinder being mounted on said journal means, whereby the reaction from braking bypasses the resilient supporting means for the truck frame.

2. In a car truck, a substantially rigid truck frame including side frames having pedestal arms, a pair of wheeled axles, journals for supporting the truck frame on the axles, clamping plate means mounted on the journals adapted to receive the pedestal arms of the side frames and support the truck frame out of direct contact with the journal boxes, resilient means interposed between the plate means and the frame for cushioning relative movement, and braking mechanism associated with the truck, said mechanism including a brake cylinder mounted on said clamping plate means and a single brake beam for each pair of wheels carried by said frame.

3. In a car truck, a truck frame including side frames having pedestal arms, a pair of wheeled axles, journals for supporting the truck frame on the axles, clamping plates mounted on the journals adapted to receive the pedestal arms of the side frames and support the truck frame out of direct contact with the journal boxes, resilient means interposed between the plates and the frame for cushioning relative movement, and braking mechanism associated with the truck, said mechanism including a brake cylinder mounted between journals of the same axles and supported by the inside clamping plates.

4. In a car truck, a truck frame including substantially rigid side frames having pedestal arms, a pair of wheeled axles, journals for supporting the truck frame on the axles, clamping plates mounted on the journals adapted to receive the pedestal arms of the side frames and support the truck frame out of direct contact with the journal boxes, resilient means interposed between the plates and the frame for cushioning relative movement, and braking mechanism associated with the truck arranged so that substantially the entire braking reaction is directed against the axle journals, said mechanism including a dead truck lever having its fulcrum on one of the clamping plates and a single brake beam for the wheels of each axle carried by said frame.

5. In a car truck, a truck frame including side frames having pedestal arms, a pair of wheeled axles, journals for supporting the truck frame on the axles, clamping plates mounted on the journals adapted to receive the pedestal arms of the side frames and support the truck frame out of direct contact with the journal boxes, resilient means including rubber under shear interposed between the plates and the frame for cushioning relative movement, and braking mechanism including a single brake beam supported by the truck, said mechanism being so arranged that substantially the entire braking action is directed against the axle journals, said mechanism including a dead truck lever having its fulcrum mounted so that braking action is directed against the car axles without passing through the truck frame.

6. In a car truck, a truck frame including side frames, a plurality of wheeled axles, plate members rigidly mounted on said axles, resilient means for supporting said frame from said members, and brake mechanism including a brake operating lever and a brake cylinder carried by said plate members and a piston for said cylinder for operating said lever member.

7. In a car truck, a truck frame, wheeled axles for supporting said frame, journal boxes for said axles, plates immovably connected to said journal boxes, rubber elements for supporting said frame from said plates and brake mechanism comprising a brake cylinder supported by said plates, and a lever member fulcrumed on said plates and connected to the piston of said brake cylinder for operating said mechanism.

8. In a car truck, a truck frame, a plurality of wheeled axles, journal boxes for said axles, supporting members secured to and movable with said boxes, resilient means for supporting said frames from said members, an inverted U-shaped lever member, means for pivotally connecting said lever to said members, a brake cylinder provided with a piston connected to said lever, means for supporting said cylinder from said members, and brake operating mechanism connected to said lever to be operated thereby.

9. In a car truck, a substantially rigid truck frame, a plurality of wheeled axles supporting the frame, resilient means interposed between the axles and the truck frame for cushioning the frame against movement both vertically and transversely of the truck, and brake mechanism including a brake shoe for each wheel and a brake member supported from said frame, associated with the truck arranged so that substantially the entire braking action bypasses the resilient supporting means for the truck frame and is taken by the car axles.

10. In a brake arrangement, the combination of a truck having a side frame, a journal box, a wheel and axle assembly the journal end of which is disposed in cooperative relation to said journal box, a wing member mounted upon said journal box, a brake operating cylinder secured to said wing member, supported brake rigging operatively associated with said cylinder and wheel, and a flexible connection between said side frame and wing member to permit relative movements therebetween without impairing braking operations.

11. In a brake arrangement, the combination of a truck having a side frame, a journal box, a wheel and axle assembly the journal end of which is disposed in cooperative relation to said journal box, wing casting means mounted on said journal box, a brake supported by said wing casing means and adapted to be applied to said wheel, a cylinder carried by said wing casting means, an operating connection between said cylinder and said brake, and a flexible connection between said side frame and wing casting means whereby relative movement may be permitted therebetween without affecting the relative positions of said brake and wheel.

12. In a brake arrangement, the combination of a truck having a side frame, a journal box, a wheel and axle assembly the journal end of which is disposed in cooperative relation to said journal box, said truck side frame having jaws embracing and normally spaced from said journal box, a wing casting resting on and having jaws engaging said journal box, a yieldable connection between said side frame and wing casting permitting relative movement therebetween, a braking cylinder secured to said wing casting, and brake rigging supported by said wing casting and being operatively associated with said cylinder and wheel.

13. In a brake arrangement, the combination of a truck having a side frame and truck wheel associated therewith, wing means resiliently connected to said side frame, a brake cylinder secured to said wing means, a brake lever supported by said wing means and being operatively connected to said brake operating cylinder, a supported brake head carrying a brake shoe, and an operative connection between said lever and brake head for applying the brake shoe to said wheel.

MARTIN P. BLOMBERG.